United States Patent
Konishi et al.

(10) Patent No.: US 11,964,399 B2
(45) Date of Patent: Apr. 23, 2024

(54) TARGET OBJECT RECOGNITION DEVICE, MANIPULATOR, AND MOBILE ROBOT

(71) Applicant: OMRON Corporation, Kyoto (JP)

(72) Inventors: Yoshinori Konishi, Kyoto (JP); Tatsuya Koga, Kyoto (JP)

(73) Assignee: OMRON Corporation, Kyoto (JP)

( * ) Notice: Subject to any disclaimer, the term of this patent is extended or adjusted under 35 U.S.C. 154(b) by 597 days.

(21) Appl. No.: 17/267,039

(22) PCT Filed: Mar. 7, 2019

(86) PCT No.: PCT/JP2019/009027
§ 371 (c)(1),
(2) Date: Feb. 9, 2021

(87) PCT Pub. No.: WO2020/049766
PCT Pub. Date: Mar. 12, 2020

(65) Prior Publication Data
US 2021/0299878 A1    Sep. 30, 2021

(30) Foreign Application Priority Data

Sep. 7, 2018 (JP) ................................. 2018-168033

(51) Int. Cl.
*B25J 9/16* (2006.01)
*G06T 7/13* (2017.01)
*G06T 7/73* (2017.01)

(52) U.S. Cl.
CPC ............... *B25J 9/1697* (2013.01); *G06T 7/13* (2017.01); *G06T 7/73* (2017.01); *G06T 2207/20081* (2013.01); *G06T 2207/30164* (2013.01)

(58) Field of Classification Search
CPC . B25J 9/1697; B25J 9/163; B25J 5/007; B25J 9/1602; B25J 9/162; B25J 9/1628;
(Continued)

(56) References Cited

U.S. PATENT DOCUMENTS

| 9,724,826 B1 * | 8/2017 | Prats .................. B25J 9/1664 |
| 2009/0190798 A1 | 7/2009 | Lee et al. |

(Continued)

FOREIGN PATENT DOCUMENTS

| CN | 1293752 | 5/2001 |
| CN | 103085076 | 5/2013 |

(Continued)

OTHER PUBLICATIONS

"International Search Report (Form PCT/ISA/210) of PCT/JP2019/009027", dated Apr. 6, 2019, pp. 1-3.

(Continued)

*Primary Examiner* — Abby Y Lin
*Assistant Examiner* — Esvinder Singh
(74) *Attorney, Agent, or Firm* — JCIPRNET

(57) ABSTRACT

Provided is art capable of recognizing the states of a plurality of target objects arranged in a prescribed space region. This target object recognition device is provided with: a plurality of calculation processing units (21, 22) which each calculate the attitude state of a target object in a prescribed space region using a different technique; a state recognition unit (23) which recognizes the layout state of all of a plurality of target objects arranged in the space region; a method determination unit (24) which, in accordance with the result of the recognition by the state recognition unit (23), determines a method for using the results of the calculation performed by the calculation processing units (21, 22); and a target object recognition unit (25) which recognizes the attitude states of the target objects by means of the determined method for using the results of the calculation.

10 Claims, 6 Drawing Sheets

(58) Field of Classification Search
CPC ...... B25J 9/1653; B25J 9/1656; B25J 9/1661; B25J 9/1664; B25J 9/1669; B25J 9/1679; B25J 9/1684; B25J 11/0045; B25J 11/0095; B25J 19/021; B25J 19/022; G06T 7/13; G06T 7/73; G06T 2207/20081; G06T 2207/30164; G06T 2207/10012; G06T 2207/20084; G06T 7/001; G06T 7/74; G06T 7/70; G06T 7/75; G06T 15/04; G06T 15/00; G06T 11/00; G06T 11/20; G06T 11/203; G06T 7/0004; G06T 7/10; G06T 7/12; G06T 1/0014; G05B 2219/39484; G05B 2219/40014; G05B 2219/40053; G05B 2219/40532; G05B 2219/39393; G05B 2219/35161; G05B 2219/37555; G05B 2219/40564; G05B 2219/37002; G05B 2219/40543

See application file for complete search history.

(56) References Cited

U.S. PATENT DOCUMENTS

| | | |
|---|---|---|
| 2010/0004778 A1 | 1/2010 | Arimatsu et al. |
| 2014/0147240 A1* | 5/2014 | Noda .................... B25J 9/0018 414/751.1 |
| 2014/0365010 A1* | 12/2014 | Yasuda .................. G06V 20/64 348/91 |
| 2017/0021502 A1 | 1/2017 | Nusser et al. |
| 2017/0028562 A1 | 2/2017 | Yamazaki et al. |

FOREIGN PATENT DOCUMENTS

| | | |
|---|---|---|
| CN | 104134188 | 11/2014 |
| CN | 104227723 | 12/2014 |
| CN | 106826809 | 6/2017 |
| CN | 107775638 | 3/2018 |
| EP | 2810747 | 12/2014 |
| JP | 2006242943 | 9/2006 |
| JP | 2007304857 | 11/2007 |
| JP | 5429614 | 2/2014 |
| JP | 2015203680 | 11/2015 |
| JP | 2015212644 | 11/2015 |
| JP | 2016170050 | 9/2016 |
| KR | 20120008211 | 1/2012 |

OTHER PUBLICATIONS

"Written Opinion of the International Searching Authority (Form PCT/ISA/237) of PCT/ JP2019/009027", dated Apr. 6, 2019, pp. 1-6.

Yoshihiko Nakamura et al., "Geometrical fusion method for multi-sensor robotic systems," Proceedings of the International Conference on Robotics and Automation, vol. 2, May 1989, pp. 668-673.

"Search Report of Europe Counterpart Application", dated May 13, 2022, p. 1-p. 8.

"Office Action of China Counterpart Application", issued on Dec. 6, 2023, with English translation thereof, p. 1-p. 20.

* cited by examiner (a)

(b)

TARGET OBJECT RECOGNITION DEVICE, MANIPULATOR, AND MOBILE ROBOT

CROSS-REFERENCE TO RELATED APPLICATION

This application is a 371 application of the International PCT application serial no. PCT/JP2019/009027, filed on Mar. 7, 2019, which claims the priority benefits of Japan Patent Application No. 2018-168033, filed on Sep. 7, 2018. The entirety of each of the above-mentioned patent applications is hereby incorporated by reference herein and made a part of this specification.

TECHNICAL FIELD

The invention relates to a target object recognition device, a manipulator, and a mobile robot.

RELATED ART

In the related art, technologies of gripping and conveying a plurality of workpieces loaded adjacent to each other by picking workpieces with a robot are known. In these technologies, a position of a workpiece is taught to a robot in advance and the workpiece is arranged at the taught position so that the robot can pick the workpiece. On the other hand, when positions at which a plurality of workpieces are arranged are misaligned or when a plurality of loaded workpieces collapses and is put into a bulk state, the robot cannot pick the respective workpieces.

Therefore, a technology for detecting an edge portion of each workpiece from an entire image captured by photographing a plurality of loaded workpieces, recognizing a position and attitude of each workpiece with the edge portion as a boundary, and picking up the workpieces with a robot has been proposed (see, for example, Patent Literature 1).

CITATION LIST

Patent Literature

Patent Literature 1: Japanese Patent No. 5429614

SUMMARY OF INVENTION

Technical Problem

However, when workpieces collapse and are brought into a bulk state, it may become difficult to detect an edge portion of each workpiece due to deterioration of illumination conditions, the presence of workpieces having the same color as a background, and the like. Therefore, for workpieces in a bulk state, a technique of detecting an edge of a workpiece from a captured image and recognizing a position and an attitude of the workpiece is not effective, and a technology capable of recognizing a state of a workpiece is desired.

One aspect of the invention has been made in view of the above circumstances, and an objective of the invention is to provide a technology capable of recognizing states of a plurality of target objects arranged in a prescribed space region.

Solution to Problem

In order to solve the problem, a target object recognition device according to an aspect of the invention includes a plurality of calculation processing units configured to calculate an attitude state of a target object in a prescribed space region in which a plurality of target objects is able to be arranged, each calculation processing unit calculating the attitude state of the target object using a different technique; a state recognition unit configured to recognize a layout state of all of the plurality of target objects arranged in the space region; a method determination unit configured to determine a method for using calculation results of the plurality of calculation processing units depending on recognition results of the state recognition unit; and a target object recognition unit configured to recognize the attitude state of the target object by the method for using the calculation results determined by the method determination unit.

In order to solve the problem, a manipulator according to an aspect of the invention includes a robot arm configured to perform a gripping operation on a target object; the target object recognition device; and a control unit configured to control an operation of the robot arm based on a target object recognition result of the target object recognition device.

In order to solve the above problem, the mobile robot according to the aspect of the invention includes the manipulator and an automatic guided vehicle that conveys the manipulator.

Advantageous Effects of Invention

According to the aspect of the invention, it is possible to recognize the state of the plurality of target objects arranged in the prescribed space region.

Figure 4:
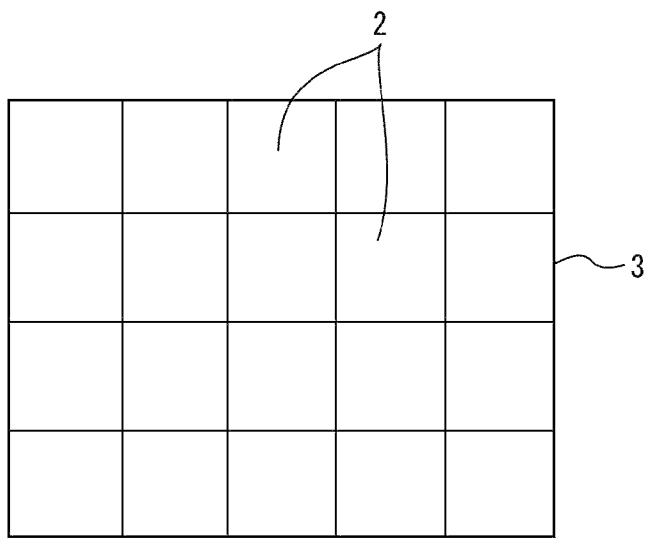
Figure 4:
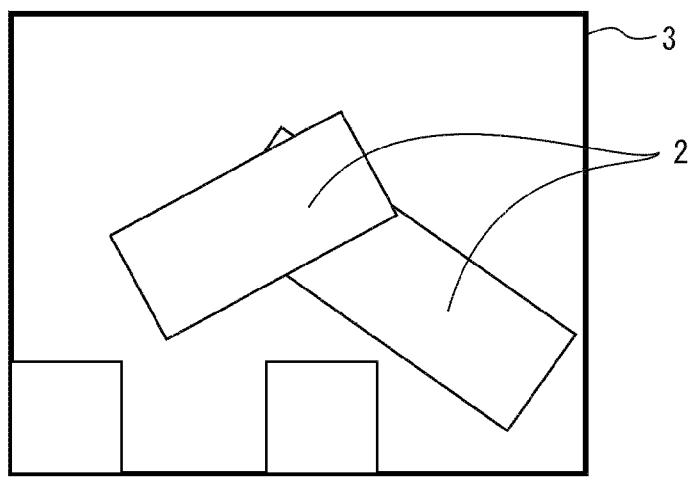

(a) of FIG. 4 is a diagram schematically illustrating a layout state of a plurality of target objects in an aligned state, and (b) of FIG. 4 is a diagram schematically illustrating a layout state of a plurality of target objects in a bulk state.

Figure 5:
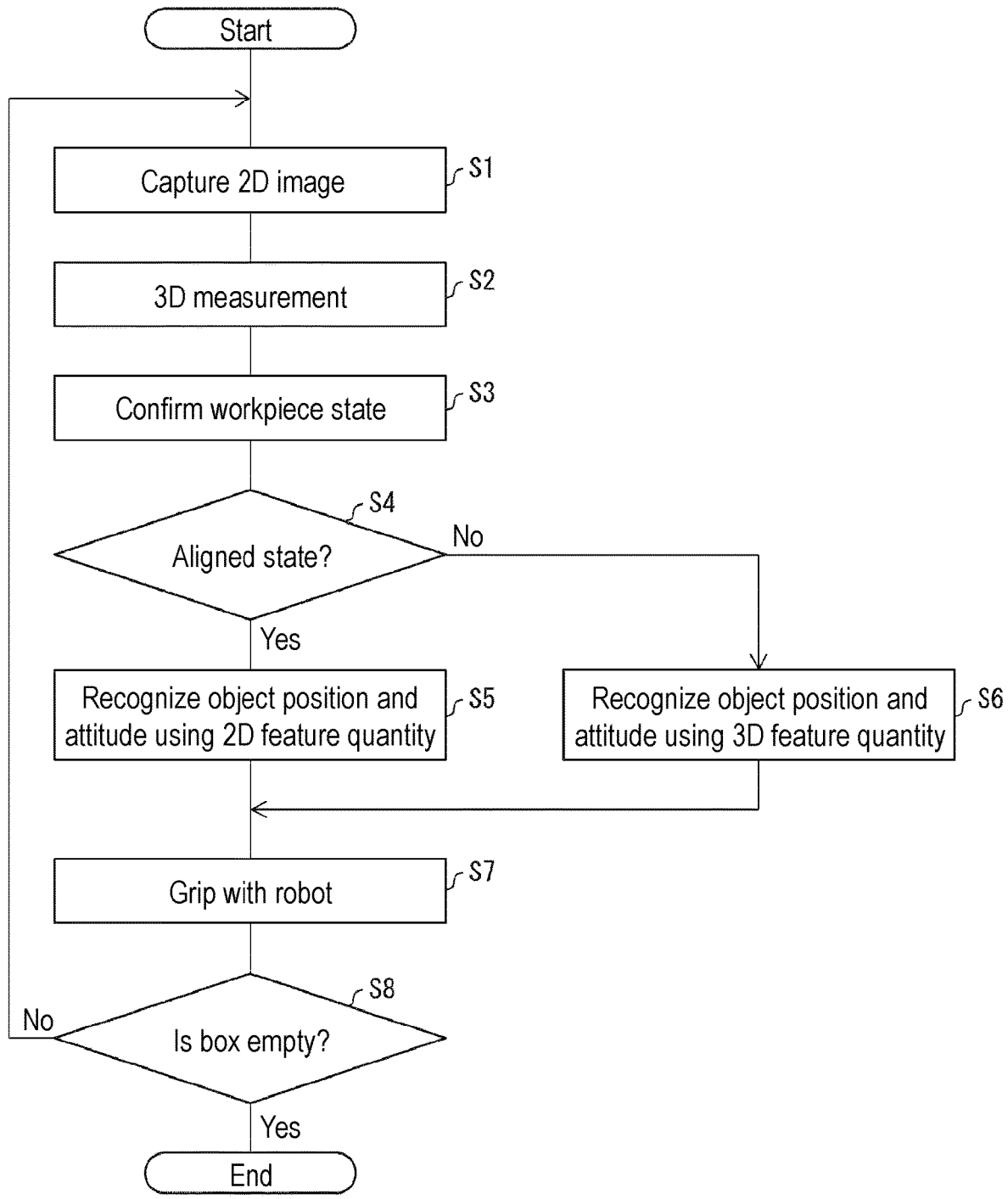

FIG. 5 is a flowchart illustrating a flow of a process of the target object recognition device.

Figure 6:
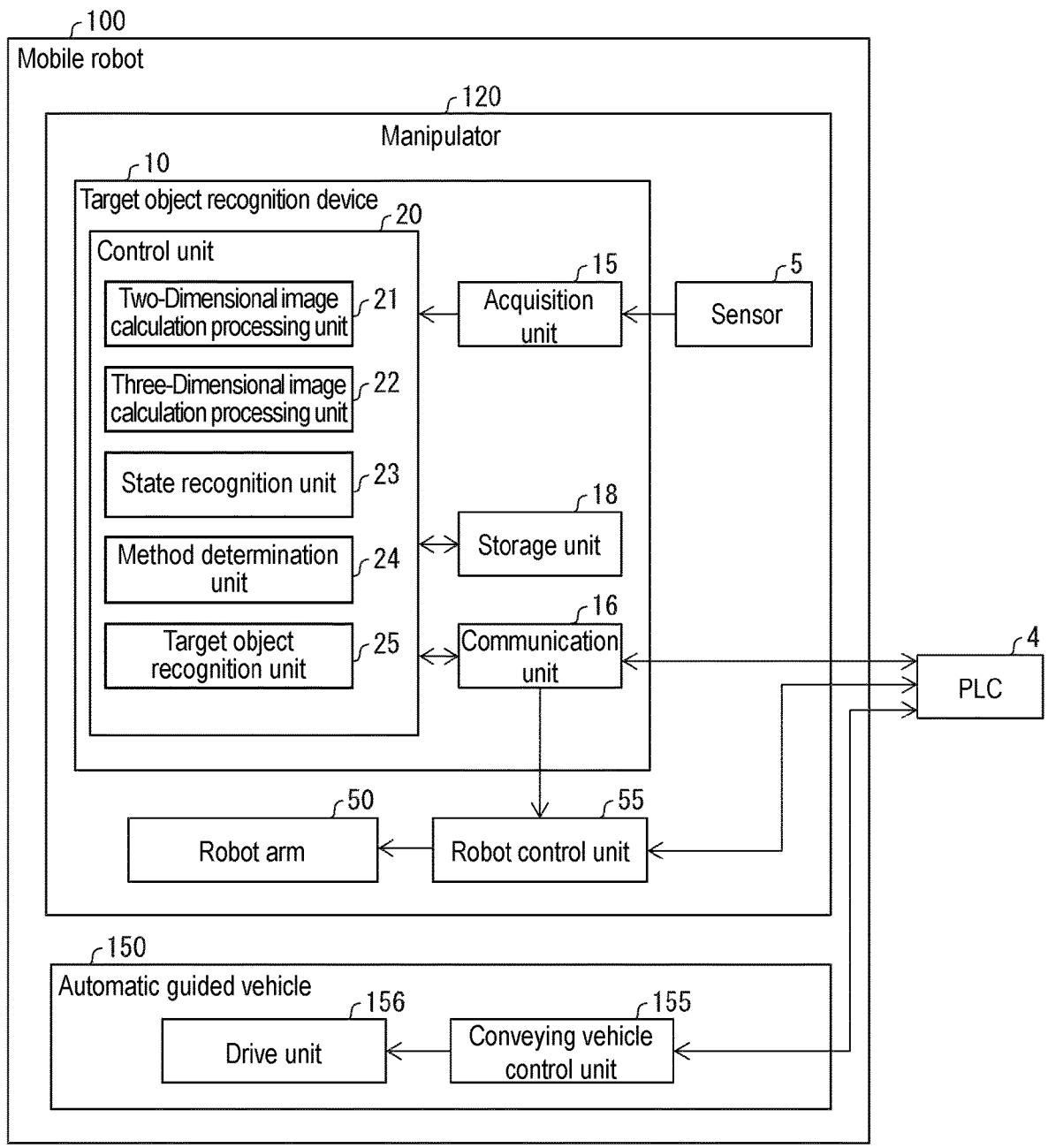

FIG. 6 is a block diagram illustrating main configurations of a manipulator and a mobile robot including the manipulator.

Figure 7:
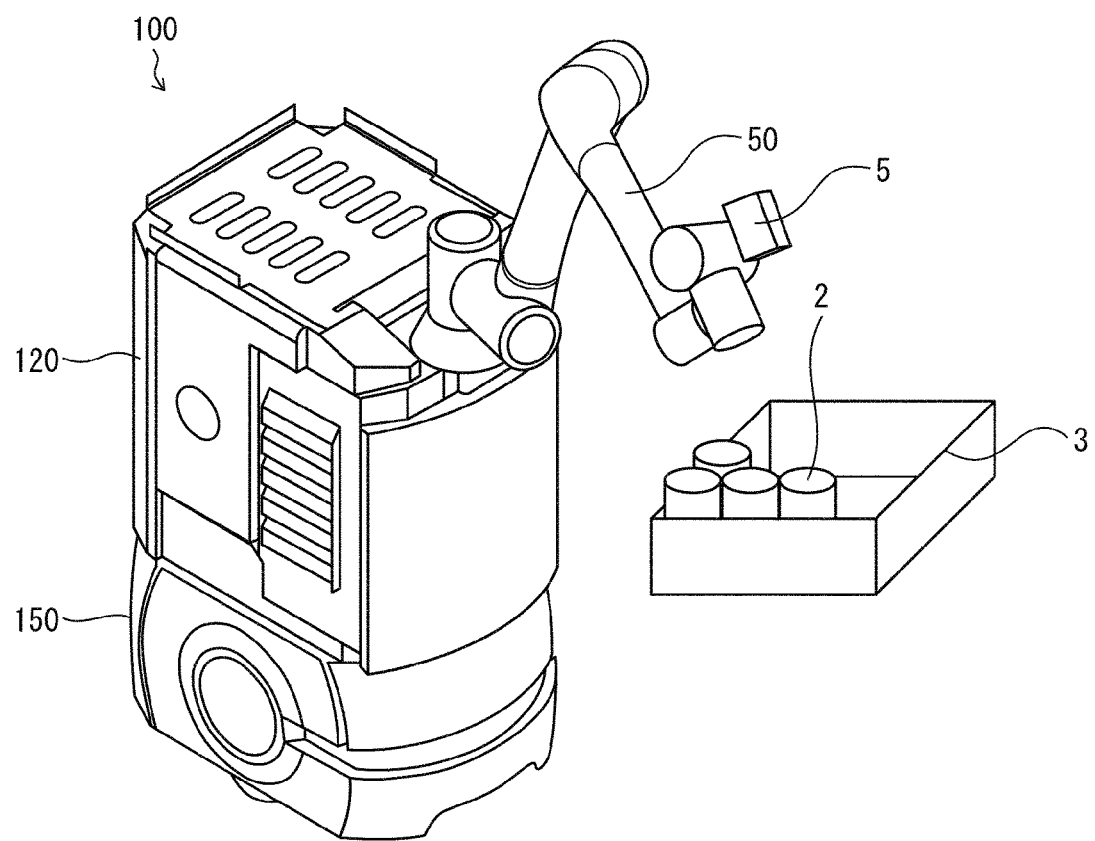

FIG. 7 is a perspective view illustrating an appearance configuration of a mobile robot.

DESCRIPTION OF EMBODIMENTS

Hereinafter, an embodiment according to an aspect of the invention (hereinafter also referred to as "the embodiment") will be described with reference to the drawings.

§ 1 Application Example

Figure 1:
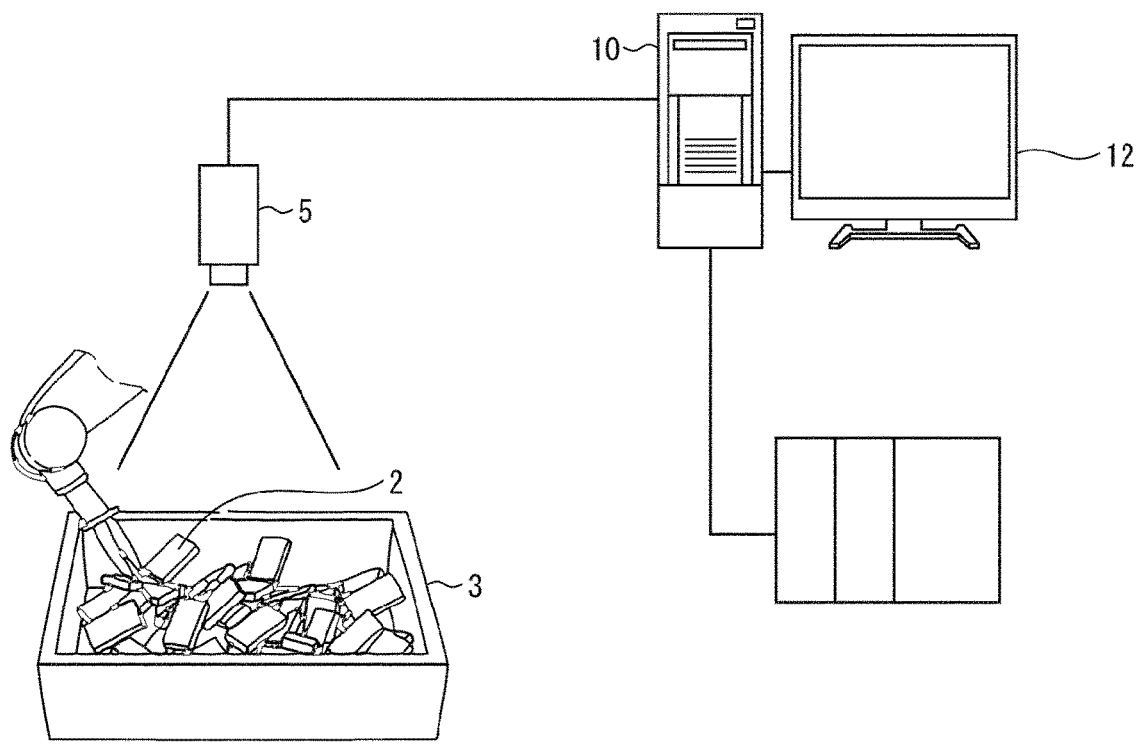
FIG. 1 is a diagram illustrating an overview of a system environment in which a target object recognition device according to the present embodiment is used.

First, an example of a scene in which the invention is applied will be described with reference to FIG. 1. FIG. 1 is a diagram illustrating an overview of a system environment in which the target object recognition device 10 according to the embodiment is used. The target object recognition device 10 is a device that is used to recognize a state of a plurality of target objects 2 that are gripped and conveyed by a robot arm 50.

The plurality of target objects 2 are placed in a prescribed space region defined by, for example, a container 3 or a pallet. The target object recognition device 10 recognizes a layout state of the target objects 2 in the prescribed space region by referring to sensor information acquired from a sensor 5.

Further, the target object recognition device 10 includes a plurality of calculation processing units that calculate the attitude state of the target objects 2 in the prescribed space region, and a method for using calculation result of the respective calculation processing units is determined depending on a layout state of all of the plurality of target objects 2. Accordingly, the target object recognition device 10 accurately recognizes the attitude state (position and attitude) of each target object 2 using a method according to the layout state of all of the plurality of target objects 2.

The target object recognition device 10 may constitute a manipulator 120 together with the robot arm 50 that performs a gripping operation on the target object 2, and a robot control unit that controls an operation of the robot arm 50. The manipulator 120 moves the robot arm 50 depending on the attitude state of the target object 2 recognized by the target object recognition device 10, and grips and conveys the target object 2.

Further, the target object recognition device 10 may be mounted on an automatic guided vehicle 150 that conveys the manipulator 120 as a functional unit of the manipulator 120 to constitute a mobile robot 100.

§ 2 Configuration Example

Embodiment 1

Figure 2:
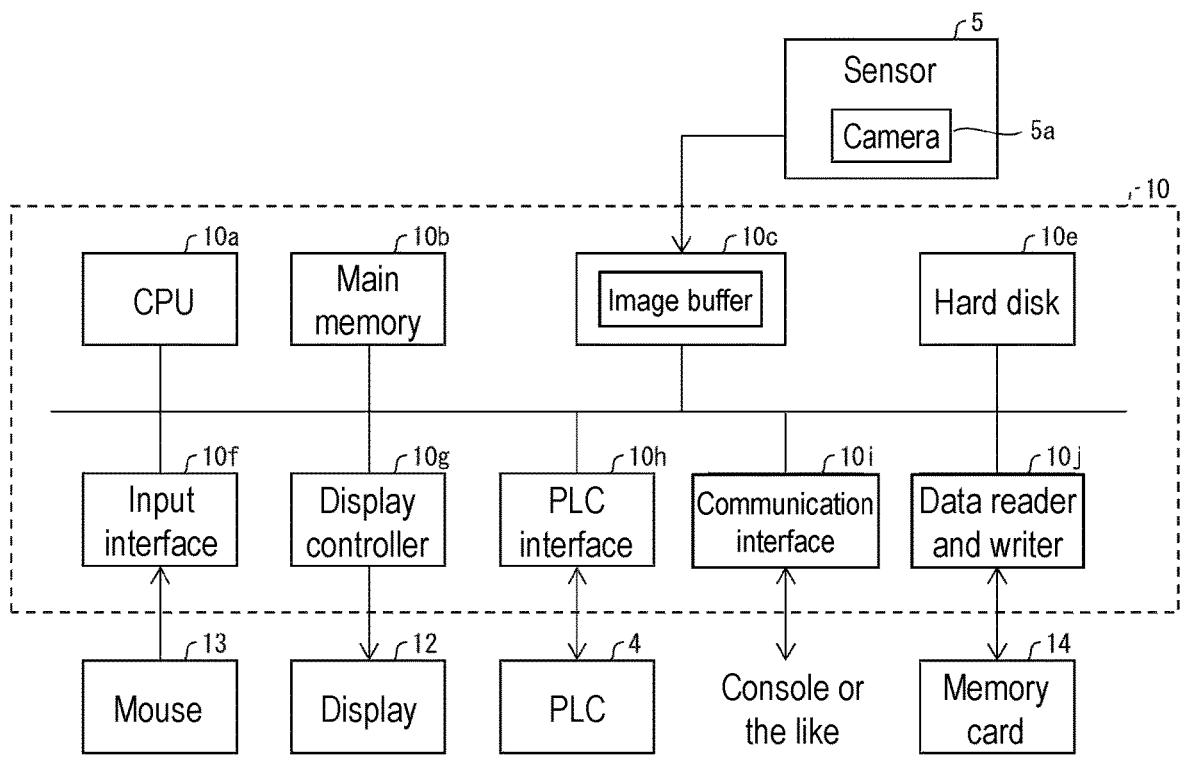
FIG. 2 is a hardware configuration diagram of the target object recognition device.
Figure 3:
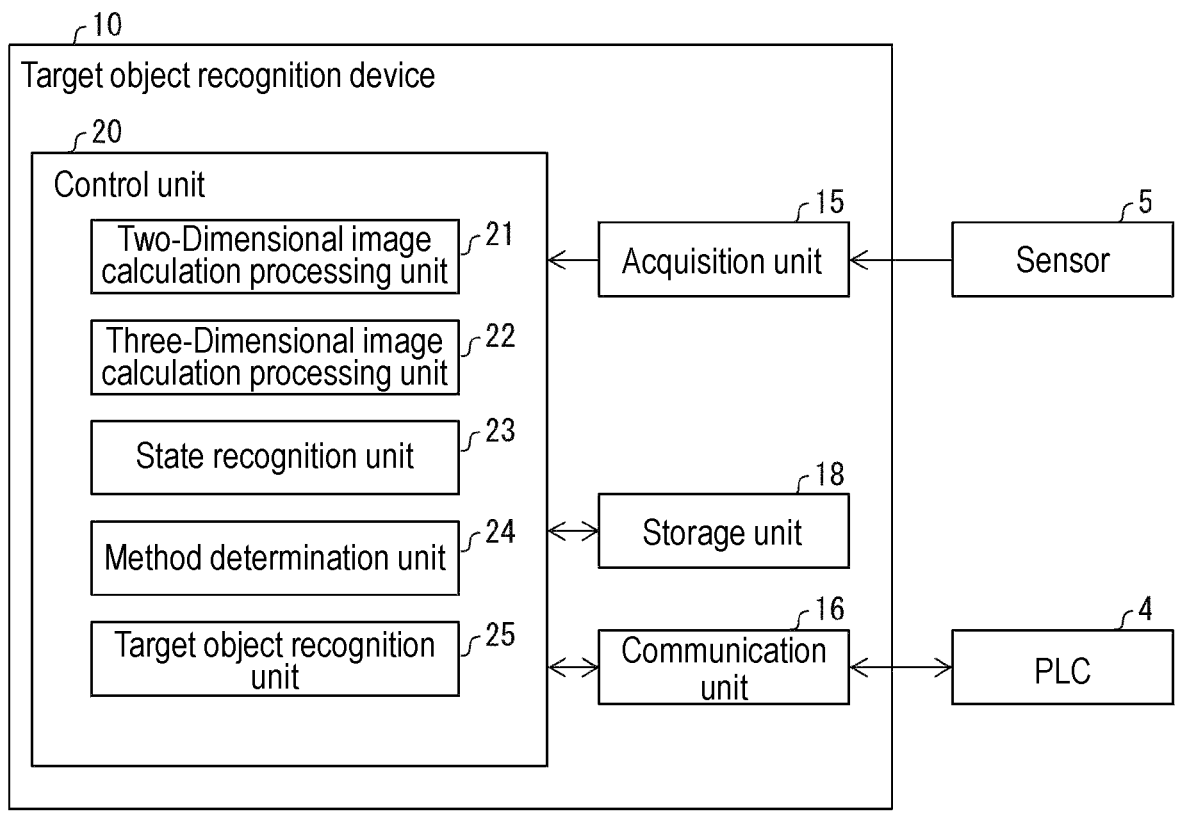
FIG. 3 is a block diagram illustrating a main configuration of the target object recognition device.

Hereinafter, a configuration of the target object recognition device 10 according to Embodiment 1 of the invention will be described in detail with reference to FIGS. 1, 2, and 3. FIG. 1 is a diagram schematically illustrating a schematic configuration of the target object recognition device 10. FIG. 2 is a hardware configuration diagram of the target object recognition device 10. FIG. 3 is a block diagram illustrating a main configuration of the target object recognition device 10.

As illustrated in FIG. 1, the target object recognition device 10 is connected to the sensor 5 and a programmable logic controller (PLC) 4. The target object recognition device 10 acquires sensor information from the sensor 5. Further, the target object recognition device 10 provides the PLC 4 with information corresponding to the sensor information acquired from the sensor 5. Although one sensor 5 is illustrated in FIG. 1, a plurality of sensors 5 may be connected to the target object recognition device 10.

The sensor 5 includes at least one of a camera 5a that captures a two-dimensional image, two cameras 5a for stereo photographing, and a sensor that senses reflected light of light radiated from a light irradiation unit (not illustrated). The sensor 5 detects the state of the plurality of target objects 2 (also referred to as workpieces) that are gripped and conveyed by the robot arm 50 (hereinafter, gripping and conveying are also referred to as picking). The target object 2 is accommodated in the container 3 that defines a space region in which the target object 2 can be placed. The sensor 5 captures, for example, an image showing the state of the plurality of target objects 2 accommodated in the container 3 and outputs the captured image.

[Hardware Configuration of Target Object Recognition Device 10]

As illustrated in FIG. 2, in the target object recognition device 10, a central processing unit (CPU) 10a, a main memory 10b, a buffer 10c, a hard disk 10e, an input interface 10f, a display controller 10g, a PLC interface 10h, a communication interface 10i, and a data reader and writer 10j are connected via a bus 10k.

The CPU 10a comprehensively controls various constituents in the target object recognition device 10 by executing a program stored in a storage element such as a RAM or a flash memory.

The main memory 10b temporarily stores various types of data that are used by the CPU 10a, calculation results of the CPU 10a, and the like. The main memory 10b includes, for example, a non-volatile memory such as a RAM, a ROM, or a flash memory.

The buffer 10c temporarily holds the sensor information acquired from the plurality of sensors 5. The buffer 10c may include an image buffer 10d that temporarily holds image data captured by the camera 5a acquired from the plurality of sensors 5.

The hard disk 10e is a storage device on or from which information that is used by the target object recognition device 10 is recorded or read.

The input interface 10f connects a mouse 13 to the target object recognition device 10 and receives an input from the mouse 13. The input interface 10f connects the mouse 13 to the target object recognition device 10 via wireless communication (short-range wireless communication) or wired communication.

The display controller 10g connects a display 12 to the target object recognition device 10 and controls a display of the display 12.

The PLC interface 10h connects the PLC 4 to the target object recognition device 10 and transmits or receives data to or from the PLC 4. The PLC interface 10h communicates with the PLC 4 via wireless communication or wired communication.

The communication interface 10i connects an external device such as a console to the target object recognition device 10. The communication interface 10i communicates with an external device via wireless communication or wired communication.

The data reader and writer 10j connects an external storage device such as a memory card 14 to the target object recognition device 10, and reads or writes data from or to the memory card 14.

[Functional Configuration of Target Object Recognition Device 10]

As illustrated in FIG. 3, the target object recognition device 10 includes an acquisition unit 15, a communication unit 16, a storage unit 18, and a control unit 20.

The acquisition unit 15 acquires the sensor information output from the plurality of sensors 5. The sensor 5 includes at least one of a 3D camera and a 2D camera. The sensor 5 may include a plurality of cameras. Further, the sensor 5 may include sensors such as a temperature sensor, an optical sensor, an edge sensor, and an infrared camera. Each of the plurality of sensors 5 may be able to acquire an image of the target object or measure an edge of the target object, a texture of a surface of the target object, a brightness of the surface of the target object, and a distance to a predetermined point on the target object. The acquisition unit 15 provides the sensor information acquired from the sensor 5 to the control unit 20.

The communication unit 16 communicates with the PLC 4 that collectively controls the target object recognition device 10, the sensor 5, and the robot arm 50. The communication unit 16 provides the control information received from the PLC 4 to the control unit 20, and transmits a recognition result of the control unit 20 to the PLC 4.

The storage unit 18 stores various types of data that are used by the control unit 20.

The control unit 20 comprehensively controls the entire target object recognition device 10. The control unit 20 includes a two-dimensional image calculation processing unit 21, a three-dimensional image calculation processing unit 22, a state recognition unit 23, a method determination unit 24, and a target object recognition unit 25. In the following description, the two-dimensional image calculation processing unit 21 and the three-dimensional image calculation processing unit 22 are also collectively referred to as a calculation processing unit.

The two-dimensional image calculation processing unit 21 detects the edge of each target object from the two-dimensional images of the plurality of target objects arranged in the prescribed space region acquired from the sensor 5 via the acquisition unit 15. The two-dimensional image calculation processing unit 21 performs pattern matching of the edge of the target object detected from the two-dimensional image with a model of a shape of the target object stored in the storage unit 18 to recognize a three-dimensional position and orientation of the target object. Further, the two-dimensional image calculation processing unit 21 may perform pattern matching with a texture model of the surface of the target object detected from the two-dimensional image to recognize the three-dimensional position and orientation of the target object.

The three-dimensional image calculation processing unit 22 calculates an attitude state of the plurality of target objects arranged in the prescribed space region using a predetermined three-dimensional shape measurement method based on the sensor information acquired from the sensor 5 via the acquisition unit 15.

For example, the sensor 5 includes a light irradiation unit (not illustrated), and irradiates the plurality of target objects arranged in the prescribed space region with light having a two-dimensional pattern (constant period pattern) or light in a linear form from the light irradiation unit. The sensor 5 provides the three-dimensional image calculation processing unit 22 with an image obtained by capturing a distortion of the pattern of the light applied to the target object or an output of the optical sensor. The three-dimensional image calculation processing unit 22 may measure the three-dimensional shape of the plurality of target objects arranged in the prescribed space region based on the distortion of the pattern of the light applied to the target object, and calculate the attitude state of the target object based on the measured three-dimensional shape of the target object. The three-dimensional image calculation processing unit 22 may calculate the attitude state of the plurality of target objects arranged in the prescribed space region using a time of flight (TOF) technique for measuring a distance for each pixel using a time from transmission of light to reception of light reflected by the target object based on the sensor information acquired from the sensor 5.

Further, the sensor 5 may include two cameras that perform stereo-photographing on the plurality of target objects arranged in the prescribed space region, and the three-dimensional image calculation processing unit 22 may calculate the attitude state of the plurality of target objects arranged in the prescribed space region by referring to an image obtained by performing stereo-photographing on the target objects, which has been acquired from the sensor 5 via the acquisition unit 15.

The sensor 5 may be configured to provide a sensor output to each of the two-dimensional image calculation processing unit 21 and the three-dimensional image calculation processing unit 22. Further, the target object recognition device 10 may be provided with a plurality of sensors 5 corresponding to each of the two-dimensional image calculation processing unit 21 and the three-dimensional image calculation processing unit 22.

Thus, the target object recognition device 10 includes the plurality of calculation processing units 21 and 22 that calculate the attitude state in the prescribed space region in which the plurality of target objects can be arranged. The calculation processing units 21 and 22 performs calculation of the attitude states of the plurality of target objects arranged in the prescribed space region using a different technique.

The state recognition unit 23 recognizes whether the layout state of all of the plurality of target objects arranged in the space region is an aligned state in which the target objects are arranged in an aligned state or a bulk state in which target objects are stacked in bulk based on a calculation result of at least one of the calculation processing units 21 and 22.

The state recognition unit 23 calculates a distribution state in a normal direction of a surface included in the space region based on calculation results of the attitude state of a plurality of target objects of at least one of the calculation processing units 21 and 22, and recognizes whether the layout state of all of the plurality of target objects is the aligned state or the bulk state based on the calculated distribution state in the normal direction of the surface included in the space region.

Further, the state recognition unit 23 may calculate a degree of reliability of the three-dimensional position and orientation recognition results of the two-dimensional image calculation processing unit 21, determine that the layout state is an aligned state when the degree of reliability is equal to or higher than a predetermined value, and determine that the layout state is the bulk state when the degree of reliability is lower than the predetermined value to thereby recognize the layout state of all of the plurality of target objects.

Further, the state recognition unit 23 may recognize a current layout state of all of the plurality of target objects by referring to a learning result obtained by performing machine learning in advance on each predetermined layout state of all of the plurality of target objects with respect to the calculation of the attitude state of the predetermined calculation processing units 21 and 22 among the calculation processing units 21 and 22. The learning result of machine learning as an identifier for identifying whether the layout state of all of the plurality of target objects is the aligned state or the bulk state is stored in the storage unit 18. The state recognition unit 23 compares the identifier stored in the storage unit 18 with the calculation result of the attitude state of the target object of at least one of the calculation processing units 21 and 22 to recognize the current layout state of all of the plurality of target objects.

A learning result obtained by performing machine learning on a case in which the layout state of all of the plurality of target objects is the aligned state in advance and a learning result obtained by performing machine learning on a case in which the layout state of all of the plurality of target objects is the bulk state in advance may be stored in the storage unit 18. The state recognition unit 23 may compare the learning result of machine learning for each predetermined layout state of all of the plurality of target objects stored in the storage unit 18 with the calculation result of the attitude state of the target objects of at least one of the calculation processing units 21 and 22 to recognize the current layout state of all of the plurality of target objects.

A plurality of candidates for image data (2D, 3D) of the aligned state and a plurality of candidates for image data (2D, 3D) of the bulk state may be stored in the storage unit 18. The state recognition unit 23 may recognize the current layout state of all of the plurality of target objects based on a degree of matching or a degree of similarity between the current layout state of all of the plurality of target objects calculated by the calculation processing units 21 and 22 and a plurality of pieces of image data for each layout state of all of the plurality of target objects stored in the storage unit 18.

The method determination unit 24 determines a method for using the calculation result of each of the calculation processing units 21 and 22 depending on the recognition result of the state recognition unit 23.

FIG. 4 is a diagram illustrating an example of a layout state of all of a plurality of target objects in a prescribed space region, (a) of FIG. 4 illustrates an example of the aligned state, and (b) of FIG. 4 illustrates an example of the bulk state. As illustrated in (a) of FIG. 4, when the layout state of all of the plurality of target objects is the aligned state, a region in which the plurality of target objects is arranged becomes one plane in the image. Therefore, when a calculation result of the three-dimensional image calculation processing unit 22 is used, it is difficult to recognize a shape and attitude of each target object. On the other hand, using a calculation result of the two-dimensional image calculation processing unit 21, it is possible to recognize a shape of each target object and an attitude such as an orientation or tilt of the target object using a boundary of each target object and a feature such as a texture, a pattern, and character on a surface of each target object.

Further, as illustrated in (b) of FIG. 4, when the layout state of all of the plurality of target objects is the bulk state, it becomes difficult to see the boundaries and shapes of the plurality of target objects. Further, in a target object arranged to be tilted with respect to the sensor 5, an illumination condition of the light from the light irradiation unit changes. Further, in a target object having a plain surface, it is not possible to recognize the orientation and tilt of the target object from the result of calculating the two-dimensional image using the texture, pattern, character, or the like of the surface. Therefore, when the calculation result of the two-dimensional image calculation processing unit 21 is used, it is difficult to recognize the shape and attitude of each target object. On the other hand, using the calculation result of the three-dimensional image calculation processing unit 22, it is possible to recognize the shape and attitude of each target object.

The method determination unit 24 may select use of the calculation result of the two-dimensional image calculation processing unit 21 when the recognition result of the layout state of all of the plurality of target objects of the state recognition unit 23 indicates the aligned state, and select use of the calculation result of the three-dimensional image calculation processing unit 22 when the recognition result of the layout state of all of the plurality of target objects of the state recognition unit 23 indicates the bulk state.

Further, when the recognition result of the state recognition unit 23 indicates the aligned state, it is necessary to acquire depth information on the position and attitude of the target object in the three-dimensional space in order to pick the target object with the robot arm 50. Further, when box-shaped target objects are arranged in a plurality of stages or box-shaped target objects having different sizes are aligned in different stages, it is necessary to acquire information on an overlapped state of the target objects. Therefore, the method determination unit 24 may determine the method for using the calculation result so that states such as the boundary of the target object and the orientation of the target object are recognized using the calculation result of the two-dimensional image calculation processing unit 21, and depths and an overlapped state of the target objects are recognized using the calculation result of the three-dimensional image calculation processing unit 22.

Further, when the plurality of target objects is in the bulk state, a two-dimensional feature quantity may be effective in recognizing the state of the target objects. Therefore, the method determination unit 24 may weight each of the calculation result of the two-dimensional image calculation processing unit 21 and the calculation result of the three-dimensional image calculation processing unit 22 depending on whether the recognition result of the state recognition unit 23 indicates the aligned state or the bulk state. The method determination unit 24 may be able to change a weight of each of the calculation result of the two-dimensional image calculation processing unit 21 and the calculation result of the three-dimensional image calculation processing unit 22 based on the learning result obtained by performing machine learning on the layout state of the target objects in advance.

Further, the method determination unit 24 may determine whether the calculation result of the two-dimensional image calculation processing unit 21 is emphasized or the calculation result of the three-dimensional image calculation processing unit 22 is emphasized using a degree of matching or a degree of similarity between the current layout state of the target objects calculated by the state recognition unit 23 and the learning result obtained by performing machine learning on each predetermined layout state of the target objects. Further, the method determination unit 24 may determine how much the calculation result of the two-dimensional image calculation processing unit 21 and the calculation result of the three-dimensional image calculation processing unit 22 are emphasized using the degree of matching or the degree of similarity between the current layout state of the target objects and the learning result of machine learning for each layout state.

Thus, the method determination unit 24 determines whether the calculation result of the two-dimensional image calculation processing unit 21 is used, the calculation result of the three-dimensional image calculation processing unit 22 is used, or the calculation result of the two-dimensional image calculation processing unit 21 and the calculation result of the three-dimensional image calculation processing unit 22 are used in order to recognize the state of each target object.

The target object recognition unit 25 recognizes an attitude state that is a state such as a position, shape, orientation, and tilt of the specific target object among the plurality of target objects using a method for using the calculation result determined by the method determination unit 24. The target object recognition unit 25 recognizes the attitude state of the target object to be picked next by the robot arm 50, and provides a recognition result to the PLC 4 via the communication unit 16.

The target object recognition unit 25 recognizes the attitude state of the specific target object using a method for using the calculation result of the attitude state of the target objects of the calculation processing units 21 and 22 selected by the method determination unit 24. When the method determination unit 24 selects the use of the calculation result of the two-dimensional image calculation processing unit 21, the target object recognition unit 25 recognizes an attitude state such as the position, shape, orientation, and tilt of the specific target object using the calculation result of the attitude state of the two-dimensional image calculation processing unit 21. Further, when the method determination unit 24 selects the use of the calculation result of the three-dimensional image calculation processing unit 22, the target object recognition unit 25 recognizes the attitude state such as the position, shape, orientation, and tilt of the specific target object using the calculation result of the attitude state of the three-dimensional image calculation processing unit 22.

Further, the target object recognition unit 25 may recognize the attitude state of the specific target object based on the calculation result of the three-dimensional shape of the target object of the calculation processing units 21 and 22 weighted by the method determination unit 24.

[Flow of Process Target Object Recognition Device 10]

FIG. 5 is a flowchart illustrating a flow of a process of the target object recognition device 10.

(Step S1)

The control unit 20 of the target object recognition device 10 acquires an output of the sensor 5 via the acquisition unit 15. The output of the sensor 5 may include a 2D image of the target objects 2 in the container 3 imaged by the camera included in the sensor 5. Further, the output of the sensor 5 may include a 3D image of the target objects 2 in the container 3 imaged in stereo by a plurality of cameras included in the sensor 5.

(Step S2)

The control unit 20 calculates the attitude states of the plurality of target objects 2 in the container 3 using functions of the calculation processing units 21 and 22.

(Step S3)

The control unit 20 recognizes the layout state of all of the plurality of target objects 2 arranged in the container 3 by referring to the calculation result of at least one of the calculation processing units 21 and 22 using a function of the state recognition unit 23.

(Step S4)

The control unit 20 determines whether or not the layout state of all of the plurality of target objects 2 recognized by the state recognition unit 23 in step 3 is the aligned state using a function of the method determination unit 24. When the method determination unit 24 determines that the layout state of the plurality of target objects 2 is the aligned state (Yes in step S4), the method determination unit 24 selects the use of the calculation result of the attitude state of the two-dimensional image calculation processing unit 21 and proceeds to step S5. When the method determination unit 24 determines that the layout state of the plurality of target objects 2 is not the aligned state (No in step S4), the method determination unit 24 selects the use of the calculation result of the attitude state of the three-dimensional image calculation processing unit 22 and proceeds to step S6.

(Step S5)

The target object recognition unit 25 recognizes the attitude state that is the state such as the position, shape, orientation, or tilt of the specific target object among the plurality of target objects 2 in the container 3 using the calculation result of the attitude state of the two-dimensional image calculation processing unit 21.

(Step S6)

The target object recognition unit 25 recognize the attitude state that is the state such as the position, shape, orientation, or tilt of the specific target object among the plurality of target objects 2 in the container 3 using the calculation result of the attitude state of the three-dimensional image calculation processing unit 22.

(Step S7)

The control unit 20 transmits a recognition result of the target object recognition unit 25 to the PLC 4 via the communication unit 16. The PLC 4 grips and conveys the specific target object 2 in the container 3 with the robot arm 50 by referring to the attitude state of the target object 2 provided by the target object recognition device 10.

(Step S8)

The control unit 20 of the target object recognition device 10 determines whether the container 3 is empty (is there no target object 2 in the container 3?) by referring to the sensor output from the sensor 5. When the target object 2 remains in the container 3 (No in step S8), the control unit 20 repeats the processes of steps S1 to S8. When the target object 2 does not remain in the container 3 (Yes in step S8), the control unit 20 ends the process.

A feature quantity indicating the layout state of the plurality of target objects 2 in the container 3 changes each time the robot arm 50 picks a specific target object. Therefore, each time the robot arm 50 picks, the control unit 20 recognizes the layout state of the plurality of target objects 2 in the container 3 and determines distribution indicating how much which of the calculation results of the calculation processing units 21 and 22 is used. Accordingly, the control unit 20 can accurately recognize the attitude state that is the state such as the position, shape, orientation, and tilt of the specific target object among the plurality of target objects in the prescribed space region each time the robot arm 50 picks the target object.

Embodiment 2

Hereinafter, Embodiment 2 of the invention will be described. For convenience of description, members having the same functions as the members described in Embodiment 1 are denoted by the same reference numerals, and description thereof is not repeated.

FIG. 6 is a block diagram illustrating a main configuration of the manipulator 120 and the mobile robot 100 including the manipulator 120 according to Embodiment 2. FIG. 7 is a perspective view illustrating an external configuration of the mobile robot 100.

As illustrated in FIGS. 6 and 7, the manipulator 120 includes the robot arm 50, the target object recognition device 10, and the robot control unit 55 (control unit).

The robot arm 50 performs a gripping operation on the target objects 2 arranged in the container 3. The sensor 5 is provided, for example, in the vicinity of a gripping part that grips the target object 2 in the robot arm 50.

The robot control unit 55 controls the operation of the robot arm 50 according to control information based on the target object recognition result of the target object recognition device 10, which is provided by the PLC 4. Further, the robot control unit 55 can operate the robot arm 50 having the sensor 5 attached thereto so that the sensor 5 can capture an image of all of the plurality of target objects 2 arranged in the container 3.

The manipulator 120 may be mounted on the automatic guided vehicle 150 that conveys the manipulator 120. The mobile robot 100 includes the manipulator 120 and the automatic guided vehicle 150.

The automatic guided vehicle 150 is a robot that includes a drive unit 156 and a conveying vehicle control unit 155 and is capable of autonomous traveling.

The drive unit 156 includes various types of hardware for realizing traveling of the automatic guided vehicle 150, such as drive wheels, a motor, a battery, and a safety sensor.

The conveying vehicle control unit 155 drives each unit of the drive unit 156 according to control information from the PLC 4 so that the automatic guided vehicle 150 travels.

In the mobile robot 100, the control unit 20 of the target object recognition device 10, the robot control unit 55, and the conveying vehicle control unit 155 communicate with the PLC 4 to autonomously perform recognition of the target object 2, gripping of the target object 2 using the robot arm 50, and conveyance of the target object 2 using the automatic guided vehicle 150.

Thus, the mobile robot 100 can recognize the layout state of all of the plurality of target objects 2 arranged in the prescribed space region using a function of the target object recognition device 10, and recognize an attitude state of the specific target object 2 that is picked next by the robot arm 50 using a calculation technique suitable for the recognized layout state. The mobile robot 100 can control the robot arm 50, picks the target object 2, and controls the automatic guided vehicle 150 based on the recognition result of the target object recognition device 10, such that mobile robot 100 conveys the target object 2 to a predetermined place. Further, the mobile robot 100 can control the automatic guided vehicle 150 and autonomously move so that the robot arm 50 can pick the target object 2 from the prescribed space region in which the plurality of target objects 2 are arranged.

[Example of Realization Using Software]

Control blocks (particularly, the two-dimensional image calculation processing unit 21, the three-dimensional image calculation processing unit 22, the state recognition unit 23, the method determination unit 24, and the target object recognition unit 25) of the control unit 20 of the target object recognition device 10 may be realized by a logic circuit (hardware) formed of an integrated circuit (IC chip) or the like or may be realized by software.

In the latter case, the target object recognition device 10 includes a computer that executes instructions of a program that is software that realizes each function. The computer includes, for example, one or more processors and includes a computer-readable recording medium that stores the program. In the computer, the processor reads the program from the recording medium and executes the program, thereby achieving the objective of the invention. As the processor, for example, a central processing unit (CPU) can be used. As the recording medium, it is possible to use a tape, a disk, a card, a semiconductor memory, a programmable logic circuit, or the like, in addition to a "non-transitory tangible medium" such as a read only memory (ROM). Further, a random access memory (RAM) that loads the program may be further included. Further, the program may be supplied to the computer via an arbitrary transmission medium (communication network, broadcast wave, or the like) capable of transmitting the program. One aspect of the invention can also be realized in the form of a data signal embedded in a carrier wave in which the program is embodied by electronic transmission.

A method for using calculation results of the calculation processing units 21 and 22 that are used for the calculation of the attitude state of the target object by the calculation processing units 21 and 22, the recognition of the layout state of the target objects by the state recognition unit 23, and the calculation of the attitude state by the method determination unit 24, and a specific configuration for the recognition of the attitude state of the target object by the target object recognition unit 25 do not limit the present embodiment, and for example, any one of the following machine learning techniques or a combination thereof can be used.

Support Vector Machine (SVM)
Clustering
Inductive Logic Programming (ILP)
Genetic Algorithm (GP: Genetic Programming)
Bayesian Network (BN)
Neural network (NN)

When a neural network is used, data may be processed in advance for input to the neural network and used. For such processing, for example, it is possible to use a technique such as data augmentation, in addition to one-dimensional arrangement or multidimensional arrangement of data.

When a neural network is used, a convolutional neural network (CNN) including a convolution process may be used. More specifically, a configuration in which a convolution layer for performing a convolution calculation may be provided as one or a plurality of layers included in the neural network, and a filter calculation (product-sum calculation) is performed on input data input to the layer may be adopted. Further, when the filter calculation is performed, processing such as padding may be used together or an appropriately set stride width may be adopted.

Further, a multi-layer type or super-multi-layer type neural network having several tens to several thousand layers may be used as the neural network.

Further, the method for using the calculation results of the calculation processing units 21 and 22 that are used for the calculation of the attitude state of the target object by the calculation processing units 21 and 22, the recognition of the layout state of the target objects by the state recognition unit 23, and the calculation of the attitude state by the method determination unit 24, and the machine learning that is used for the recognition of the attitude state of the target object by the target object recognition unit 25 may be supervised learning or unsupervised learning.

CONCLUSION

A target object recognition device according to an aspect of the invention includes a plurality of calculation processing units configured to calculate an attitude state of a target object in a prescribed space region in which a plurality of target objects is able to be arranged, each calculation processing unit calculating the attitude state of the target object using a different technique; a state recognition unit configured to recognize a layout state of all of the plurality of target objects arranged in the space region; a method determination unit configured to determine a method for using calculation results of the plurality of calculation processing units depending on a recognition result of the state recognition unit; and a target object recognition unit configured to recognize the attitude state of the target object by the method for using the calculation results determined by the method determination unit.

With the above configuration, it is possible to recognize the attitude state indicating the shape, position, orientation, tilt, or the like of each target object using a calculation technique suitable for the layout state of all of the plurality of target objects arranged in the prescribed space region. Therefore, even when the plurality of target objects is in the aligned state or in the bulk state, it is possible to accurately recognize the attitude state of each target object regardless of whether the plurality of target objects is in the aligned state or in the bulk state.

Further, in the target object recognition device according to an aspect of the invention, the plurality of calculation processing units may include a two-dimensional image calculation processing unit configured to perform edge detection on a two-dimensional image obtained by imaging the space region and perform pattern matching between a result of the edge detection and at least one of a shape and a texture of the target object to calculate the attitude state of the target object; and a three-dimensional image calculation processing unit configured to calculate the attitude state by a predetermined three-dimensional shape calculation technique with respect to the space region.

With the above configuration, it is possible to recognize the attitude state of each target object using at least one of the calculation results of the attitude state of the target object calculated by the two-dimensional image calculation processing unit and the attitude state of the target object calculated by the three-dimensional image calculation processing unit. Therefore, it is possible to accurately recognize the attitude state of each target object regardless of the layout state of all of the plurality of target objects.

Further, in the target object recognition device according to an aspect of the invention, the method determination unit may select a specific calculation processing unit from the plurality of calculation processing units depending on the recognition result of the state recognition unit, and the target object recognition unit may recognize the attitude state of the target object based on a calculation result of the calculation processing unit selected by the method determination unit.

With the above configuration, it is possible to accurately recognize the attitude state of each target object using a calculation result suitable for the layout state of all of the plurality of target objects between the calculation result of the two-dimensional image calculation processing unit and the calculation result of the three-dimensional image calculation processing unit.

Further, in the target object recognition device according to an aspect of the invention, the method determination unit may weight the calculation results of the plurality of calculation processing units depending on the recognition result of the state recognition unit, and the target object recognition unit may recognize the attitude state of the target object based on the calculation result of each calculation processing unit weighted by the method determination unit.

With the above configuration, it is possible to recognize the attitude state of each target object using both the calculation result of the two-dimensional image calculation processing unit and the calculation result of the three-dimensional image calculation processing unit, which are weighted according to a distribution according to the layout state of all of the plurality of target objects. Accordingly, it is possible to accurately recognize the attitude state of each target object regardless of the layout state of the plurality of target objects.

Further, in the target object recognition device according to an aspect of the invention, the state recognition unit may recognize the layout state of all of the plurality of target objects based on a distribution state in a normal direction of a surface included in the space region, the distribution state being calculated based on a calculation result of a predetermined calculation processing unit among the plurality of calculation processing units.

With the above configuration, it is possible to recognize the layout state of all of the plurality of target objects based on at least one of the calculation result of the two-dimensional image calculation processing unit and the calculation result of the three-dimensional image calculation processing unit, and to accurately recognize the attitude state of each target object using the calculation result suitable for the layout state.

Further, in the target object recognition device according to an aspect of the invention, the state recognition unit may calculate a degree of reliability of a calculation result of a two-dimensional image calculation processing unit and recognize the layout state of all of the plurality of target objects based on the degree of reliability, the two-dimensional image calculation processing unit being configured to perform edge detection on a two-dimensional image obtained by imaging the space region and perform pattern matching between a result of the edge detection and at least one of a shape and a texture of the target object to calculate the attitude state of the target object.

With the above configuration, it is possible to accurately recognize the layout state of all of the plurality of target objects, and to accurately recognize the attitude state of each target object using the calculation result suitable for the layout state.

Further, in the target object recognition device according to an aspect of the invention, the state recognition unit may refer to a learning result obtained by performing machine learning on each predetermined layout state of all of the plurality of target objects with respect to the calculation result of the predetermined calculation processing unit among the plurality of calculation processing units to recognize the layout state of all of the plurality of target objects.

With the above configuration, it is possible to accurately recognize the layout state of all of the plurality of target objects by referring to the learning result obtained by performing machine learning, and to accurately recognize the attitude state of each target object using the calculation result suitable for the layout state.

Further, a manipulator according to an aspect of the invention includes a robot arm configured to perform a gripping operation on a target object, the target object recognition device, and a control unit configured to control an operation of the robot arm based on a target object recognition result of the target object recognition device.

With the above configuration, it is possible to appropriately pick the target object regardless of the layout state of all of the plurality of target objects through an operation of the robot arm.

Further, a mobile robot according to an aspect of the invention includes the manipulator, and an automatic guided vehicle configured to convey the manipulator.

With the above configuration, it is possible to appropriately pick the target object regardless of the layout state of all of the plurality of target objects through operations of the automatic guided vehicle and the robot arm.

The invention is not limited to the above-described embodiments, and various changes can be made within the scope indicated by the claims, and embodiments obtained by appropriately combining the technical means disclosed in the different embodiments are also included in the technical scope of the invention.

The invention claimed is:

1. A manipulator comprising:
a robot arm configured to perform a gripping operation on a target object;
a target object recognition device comprising:
a plurality of calculation processing circuits configured to calculate an attitude state of the target object in a prescribed space region in which a plurality of target objects is able to be arranged, each calculation processing circuit calculating the attitude state of the target object using a different technique;
a state recognition circuit configured to recognize a layout state of all of the plurality of target objects arranged in the space region;
a method determination circuit configured to determine a method for using calculation results of the plurality of calculation processing circuits depending on a recognition result of the state recognition circuit; and
a target object recognition circuit configured to recognize the attitude state of the target object by the method for using the calculation results determined by the method determination circuit; and
a control circuit configured to control an operation of the robot arm based on a target object recognition result of the target object recognition device.

2. The target object recognition device according to claim 1,
wherein the plurality of calculation processing circuits includes
a two-dimensional image calculation processing circuit configured to perform edge detection on a two-dimensional image obtained by imaging the space region and perform pattern matching between a result of the edge detection and at least one of a shape and a texture of the target object to calculate the attitude state of the target object; and
a three-dimensional image calculation processing circuit configured to calculate the attitude state by a predetermined three-dimensional shape calculation technique with respect to the space region.

3. The target object recognition device according to claim 2,
wherein the method determination circuit selects a specific calculation processing circuit from the plurality of calculation processing circuits depending on the recognition result of the state recognition circuit, and
the target object recognition circuit recognizes the attitude state of the target object based on a calculation result of the calculation processing circuit selected by the method determination circuit.

4. The target object recognition device according to claim 2,
wherein the method determination circuit weights the calculation results of the plurality of calculation processing circuits depending on the recognition result of the state recognition circuit, and
the target object recognition circuit recognizes the attitude state of the target object based on the calculation result of each calculation processing circuit weighted by the method determination circuit.

5. The target object recognition device according to claim 1,
wherein the method determination circuit selects a specific calculation processing circuit from the plurality of calculation processing circuits depending on the recognition result of the state recognition circuit, and
the target object recognition circuit recognizes the attitude state of the target object based on a calculation result of the calculation processing circuit selected by the method determination circuit.

6. The target object recognition device according to claim 1,
wherein the method determination circuit weights the calculation results of the plurality of calculation processing circuits depending on the recognition result of the state recognition circuit, and
the target object recognition circuit recognizes the attitude state of the target object based on the calculation result of each calculation processing circuit weighted by the method determination circuit.

7. The target object recognition device according to claim 1, wherein the state recognition circuit recognizes the layout state of all of the plurality of target objects based on a distribution state in a normal direction of a surface included in the space region, the distribution state being calculated based on a calculation result of a predetermined calculation processing circuit among the plurality of calculation processing circuits.

8. The target object recognition device according to claim 1, wherein the state recognition circuit calculates a degree of reliability of a calculation result of a two-dimensional image calculation processing circuit and recognizes the layout state of all of the plurality of target objects based on the degree of reliability, the two-dimensional image calculation processing circuit being configured to perform edge detection on a two-dimensional image obtained by imaging the space region and perform pattern matching between a result of the edge detection and at least one of a shape and a texture of the target object to calculate the attitude state of the target object.

9. The target object recognition device according to claim 1, wherein the state recognition circuit refers to a learning result obtained by performing machine learning on each predetermined layout state of all of the plurality of target objects with respect to the calculation result of a predetermined calculation processing circuit among the plurality of calculation processing circuits to recognize the layout state of all of the plurality of target objects.

10. A mobile robot comprising:
the manipulator according to claim 1; and
an automatic guided vehicle configured to convey the manipulator.

* * * * *